(12) United States Patent
Kaplan et al.

(10) Patent No.: US 6,399,243 B1
(45) Date of Patent: Jun. 4, 2002

(54) AIR RECOVERY BATTERY

(75) Inventors: Alexander Kaplan, Providence, RI (US); Gary M. Searle, Norfolk, MA (US); Viet H. Vu, Middleton, WI (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/544,076

(22) Filed: Apr. 6, 2000

(51) Int. Cl.[7] .................................................. H01M 2/02
(52) U.S. Cl. ........................................ 429/176; 429/229
(58) Field of Search ................................ 429/229, 224, 429/176, 163

(56) References Cited

U.S. PATENT DOCUMENTS

| | | |
|---|---|---|
| 2,597,116 A | 5/1952 | Marsal et al. |
| 2,641,623 A | 6/1953 | Winckler et al. |
| 5,587,259 A | * 12/1996 | Dopp et al. ................ 429/233 |
| D390,187 S | * 2/1998 | Urvoy ........................ D13/103 |
| 6,083,640 A | * 7/2000 | Lee et. al. ................. 429/94 |
| 6,265,102 B1 | * 7/2001 | Shrim et al. ............... 429/172 |

FOREIGN PATENT DOCUMENTS

| | | |
|---|---|---|
| JP | 08031425 | 2/1996 |
| JP | 200082503 | 3/2000 |
| WO | WO 00/54360 | 9/2000 |

OTHER PUBLICATIONS

Literature from Cegasa International, (1983).

* cited by examiner

*Primary Examiner*—Gabrielle Brouillette
*Assistant Examiner*—M. Wills
(74) *Attorney, Agent, or Firm*—Fish & Richardson P.C.

(57) ABSTRACT

A racetrack air recovery battery having a cathode, an anode, and a separator. The battery can include a can having a racetrack cross section; a cathode assembly disposed in the can; a bottom cup disposed on an end of the cathode assembly; and anode material disposed in the can. The battery can also include a seal assembly disposed in the can. The seal assembly can include a current collector having a shape that maximizes uniform discharge of the battery.

31 Claims, 10 Drawing Sheets

Experimented Alkaline and Commercial Alkaline

Experimented Air Assisted Alkaline

AIR RECOVERY BATTERY

BACKGROUND OF THE INVENTION

This invention generally relates to air recovery electrochemical cells.

Batteries are commonly used electrical energy sources. A battery contains a negative electrode, typically called an anode, and a positive electrode, typically called a cathode. The anode contains an active material that can be oxidized; the cathode contains an active material that can be reduced. The anode active material is capable of reducing the cathode active material. In order to prevent direct reaction of the anode material and the cathode material, the anode and the cathode are electrically isolated from each other by a separator.

When the battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

An air recovery battery, also known as an air assisted or air restored battery, is a battery that uses air to recharge its cathode during periods of low or no discharge. One type of air recovery battery employs zinc powder as the anode, manganese dioxide ($MnO_2$) as the cathode, and an aqueous solution of potassium hydroxide as the electrolyte. At the anode, zinc is oxidized to zincate:

$$Zn + 4OH^- \rightarrow Zn(OH)_4^{2-} + 2e^-$$

At the cathode, $MnO_2$ is reduced to manganese oxyhydrate:

$$MnO_2 + H_2O + e^- \rightarrow MnOOH + OH^-$$

When the cell is not in use or when the rate of discharge is sufficiently slow, atmospheric oxygen enters the cell and reacts with the cathode. Manganese oxyhydrate is oxidized to form $MnO_2$:

$$\tfrac{1}{2}O_2 + MnOOH \rightarrow MnO_2 + OH^-$$

During high rates of discharge, air recovery batteries operate like conventional alkaline cell by reducing "fresh" (unreduced) $MnO_2$. During low rates of discharge and periods of rest with no current flow, the "consumed" (reduced) $MnO_2$ is restored or recharged by atmospheric oxygen to the fresh state. Since oxygen must reach the $MnO_2$ for recharging, the cathode of the battery must not be wetted completely by electrolyte. If the cathode is soaked with wet electrolyte, air transport properties inside the cathode degrade and recharging of $MnO_2$ is hampered.

SUMMARY OF THE INVENTION

In one aspect, the invention features a racetrack air recovery battery having a cathode, an anode, and a separator. The cathode may include manganese dioxide, and the anode may include zinc. The battery can provide good air distribution to the cathode and protection against leakage of electrolyte. The batteries can also be stacked together to provide high capacity or higher voltages.

In another aspect, the invention features a racetrack air recovery battery including a can having a racetrack cross section; a cathode assembly disposed in the can; a bottom portion disposed on an end of the cathode assembly; and anode material disposed in the can. The bottom portion can be a bottom cup. The cathode assembly can include a barrier layer and manganese dioxide. The anode material can include zinc. The can may include a groove. The bottom cup may allow the cathode to make better electrical contact with the can and generally provides protection against leakage of electrolyte. The bottom cup and the groove help provide an air plenum between the cathode assembly and the can to provide good air distribution to the cathode.

In another aspect, the invention features a racetrack air recovery battery including a can having a racetrack cross section; a cathode assembly disposed in the can; anode material disposed in the can; and a seal assembly disposed in the can, the seal assembly including a current collector having a shape that maximizes uniform discharge of the battery. The current collector can extend substantially along a full length of a longitudinal axis of the battery. At least two separate portions of the current collector can extend substantially along a full length of a longitudinal axis of the battery. A portion of the current collector can approximate a triangle. The current collector can provide uniform discharge of the battery for consistent and optimum battery performance.

In another aspect, the invention features a method of assembling a racetrack air recovery battery. The method includes: (a) inserting a cathode assembly into a can having a racetrack cross section; (b) placing anode material in the can; (c) inserting a seal assembly into the can, the seal assembly having a current collector; and (d) sealing the can. The method can further include placing a barrier layer adjacent to the cathode assembly, placing an air diffusion layer around the cathode assembly, and placing a bottom cup on an end of the cathode assembly. The method can include forming a groove in the can. Sealing the can may include mechanical crimping.

The details of one or more embodiments of the invention are set forth in the accompanying drawings and the description below. Other features, objects, and advantages of the invention will be apparent from the description and drawings, and from the claims.

DESCRIPTION OF THE PREFERRED EMBODIMENTS

Figure 1:
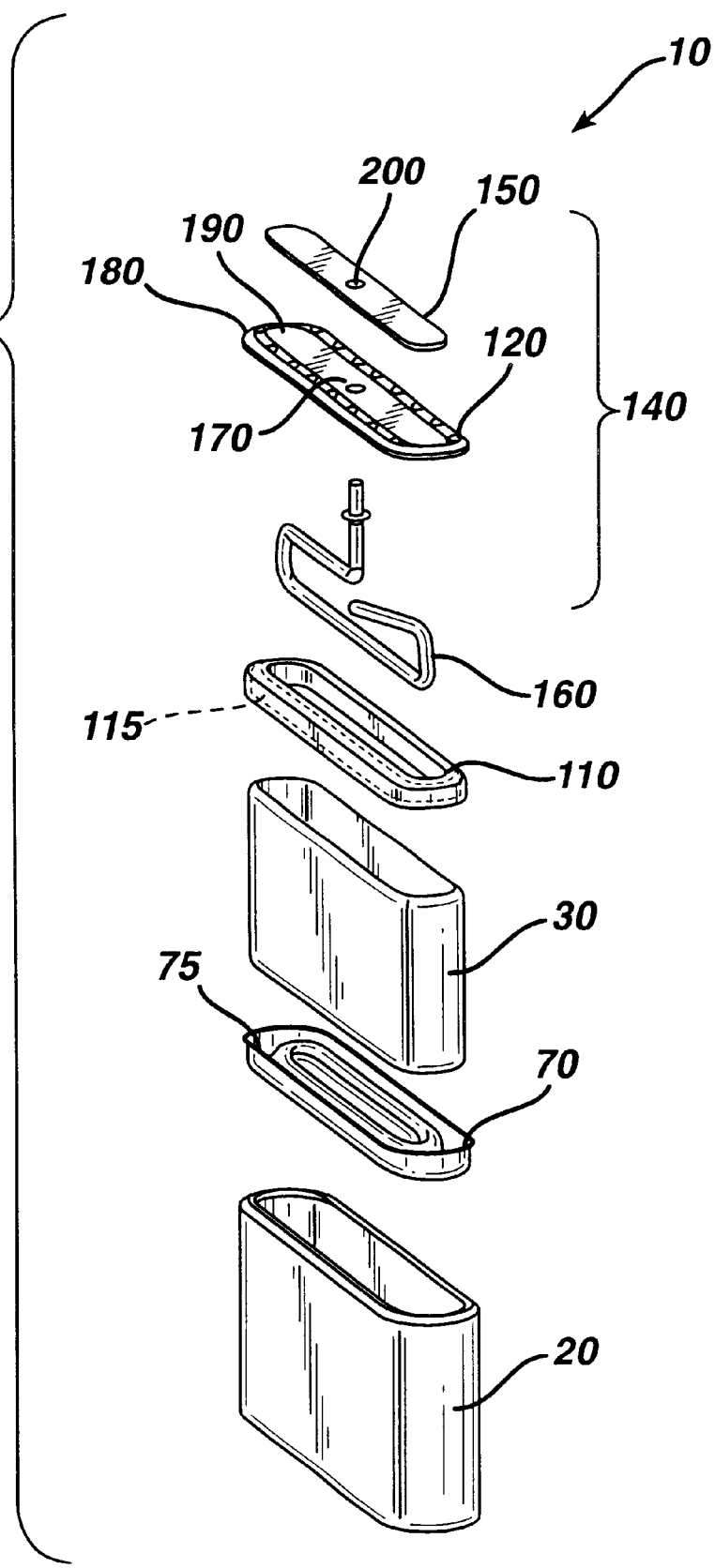
FIG. 1 is an exploded view of a racetrack air recovery battery of the invention.
Figure 2:
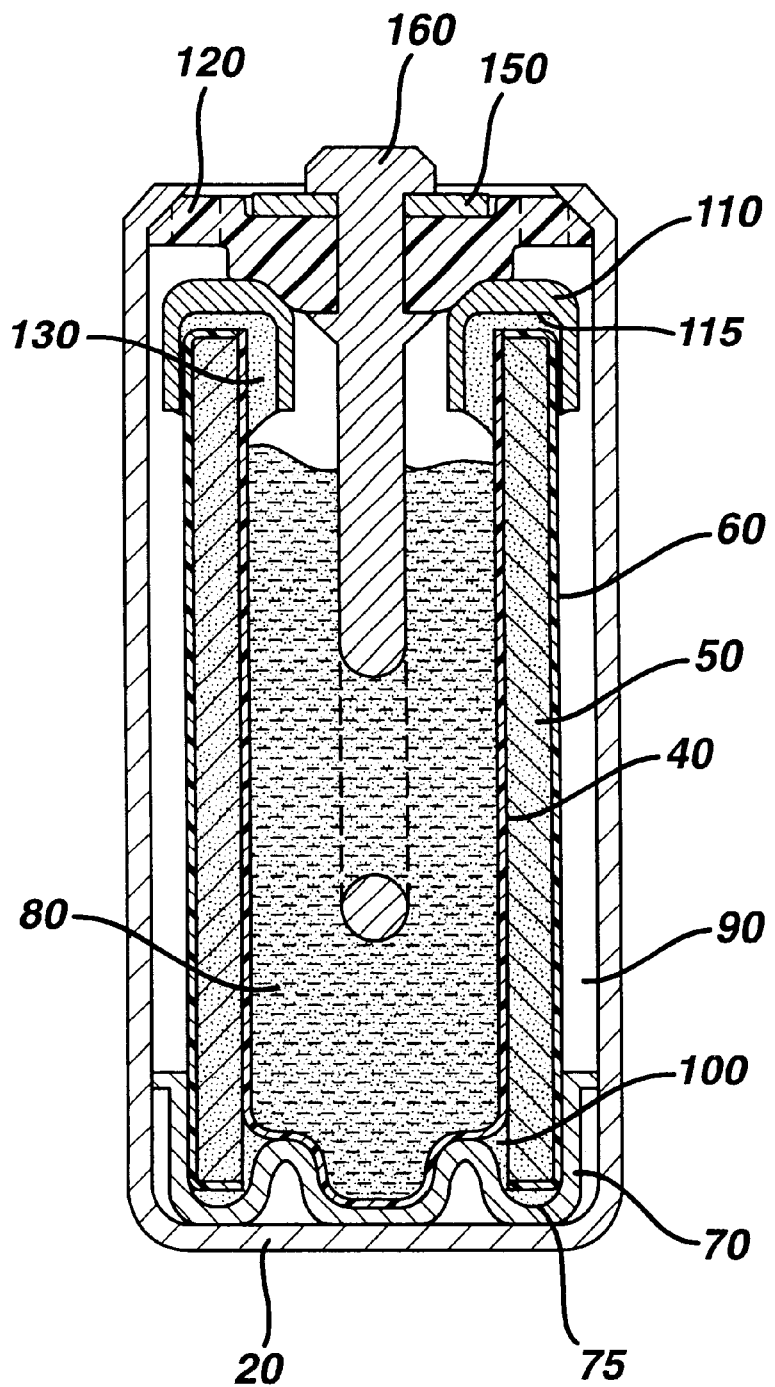
FIG. 2 is a cross-sectional view of a racetrack air recovery battery of the invention.
Figure 3:
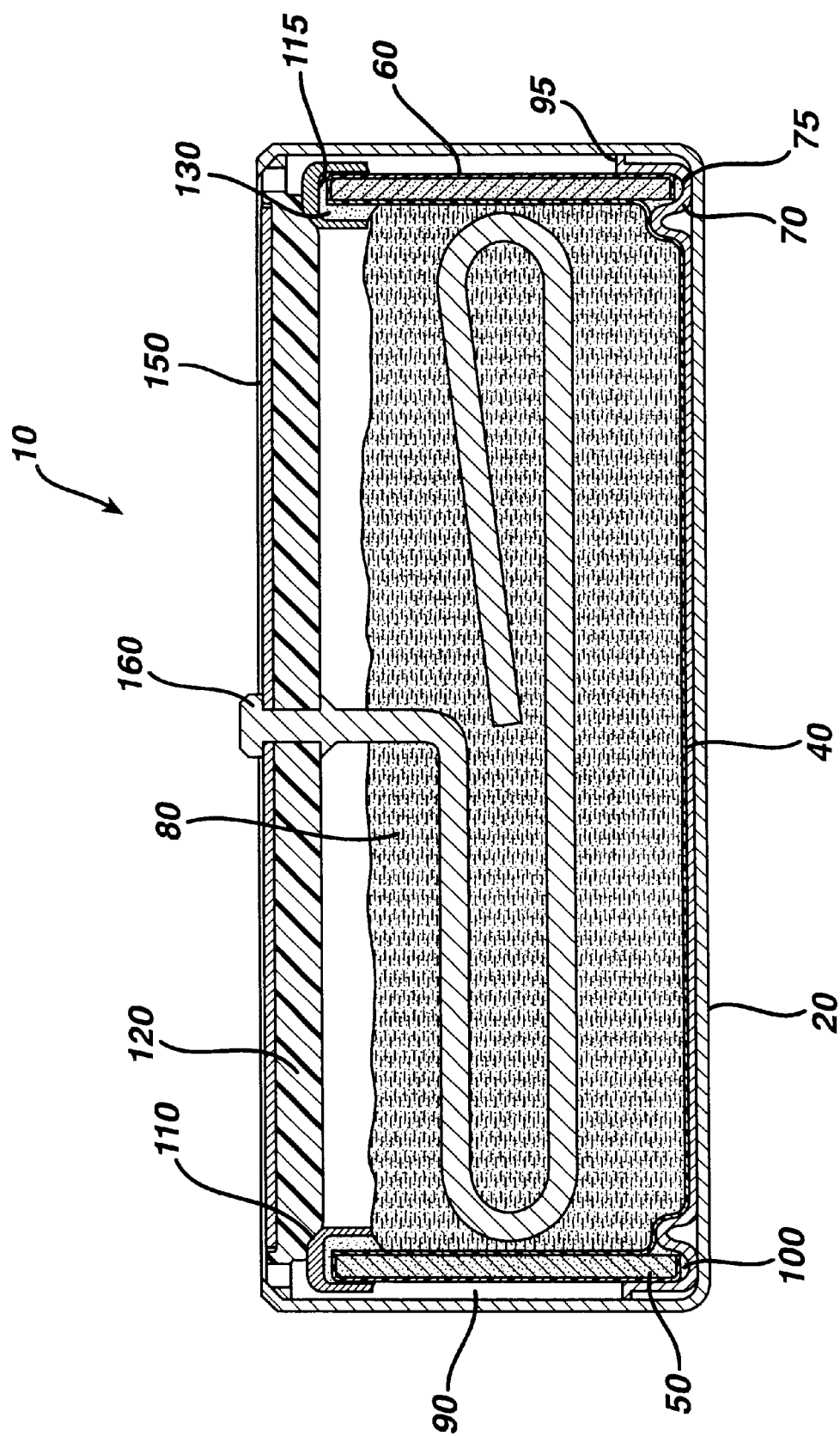
FIG. 3 is another cross-sectional view of a racetrack air recovery battery of the invention.

Referring to FIGS. 1–3, an air recovery battery 10 includes a can 20 having a racetrack cross section. In the figures, same numbers are used in different figures to refer to the same elements. The can 20 includes cathode assembly 30 formed to fit inside the can 20 to define a cavity. The cathode assembly 30 includes a separator 40, a cathode 50, and a barrier layer 60. The cathode assembly 30 further includes a bottom cup 70 placed on one end. Disposed inside the cavity of the cathode assembly 30 is an anode 80. Disposed on another end of the cathode assembly 30 is a sealing assembly 140 including a current collector 100. The can 20 is sealed, e.g., by a mechanical crimp, to form the battery 10. Generally, the method of assembling the battery 10 includes placing the cathode assembly 30 and the anode 80 into the can 20, and sealing the can 20 to form the battery 10.

As used herein, "racetrack" means a battery that has a terminal face or a cross section between terminal faces the perimeter of which is elongated and has a pair of generally parallel edges. The perimeter could have, for example, two long parallel edges joined by two curved ends, or could be a generally oval shape (including, for example, a perimeter defined by a mathematical equation of an ellipse), or have a generally arcuate shape, for example, like a pea-pod.

The dimensions of the battery 10 depend on the application or use for the cell. For example, the battery 10 can have the approximate dimensions of multiple cylindrical batteries (e.g., AA, AAA) juxtaposed side-by-side. The battery 10 can also be dimensioned such that it can be stacked on other batteries. The can is typically made of nickel-plated steel (available from Thomas Steel Co., Charlotte, N.C.).

The cathode 50 is formed on a current collector (not shown) to improve the conductivity characteristics and physical strength of the cathode 50. The current collector is a grid of expanded, electrically conducting metal or an alloy, such as nickel-plated steel. The grid can make forming the cathode 50 to a desired shape easier. In addition, the grid can be welded to the bottom cup 70 to provide better electrical contact between the cathode 50 and the can 20, as described below.

The cathode 50 can include a mixture of materials, including $MnO_2$, a hydrophobic binder, and carbon particles. The cathode 50 can include 60–93%, preferably 80–93%, of $MnO_2$ and 2–25% of a binder, with the balance being carbon particles. The cathode 50 preferably is 0.4 to 1.4 mm thick, although specific dimensions of the cathode 50 are a function of the size of the battery 10 and application, e.g., depth of discharge. The $MnO_2$ in the cathode 50 can include electrolytically synthesized $MnO_2$ (EMD), chemically synthesized $MnO_2$ (CMD), blends of EMD and CMD, or chemically modified $MnO_2$ (p-CMD). Preferably, the cathode 50 includes EMD. The $MnO_2$ in the cathode 50 can be obtained, e.g., from Kerr-McGee Chemical Corp. (Henderson, Nev.).

The binder can be a polymer such as polytetrafluoroethylene (PTFE), another fluoroethylene, or polyethylene, and is present in an amount sufficient to produce wet-proofing (i.e., to limit flooding of the cathode by the electrolyte) without hindering the electrochemical reaction involving the discharge of $MnO_2$.

For a gas diffusion electrode to be effective, a balance between electronic conductivity, ionic conductivity and gas diffusion properties must be optimized. This balance can be accomplished in a cathode with effective quantities of binder, $MnO_2$ and carbon. A cathode too highly electrolyte repellent may be effective against electrolyte penetration and effective for gas transport properties, but it may have poor ionic conductivity and discharge efficiency of $MnO_2$. The rechargeability of the cathode 50 is governed by the diffusion rate of atmospheric oxygen into the cathode 50 and the rate of chemical reaction between oxygen and $MnO_2$.

Figure 4:
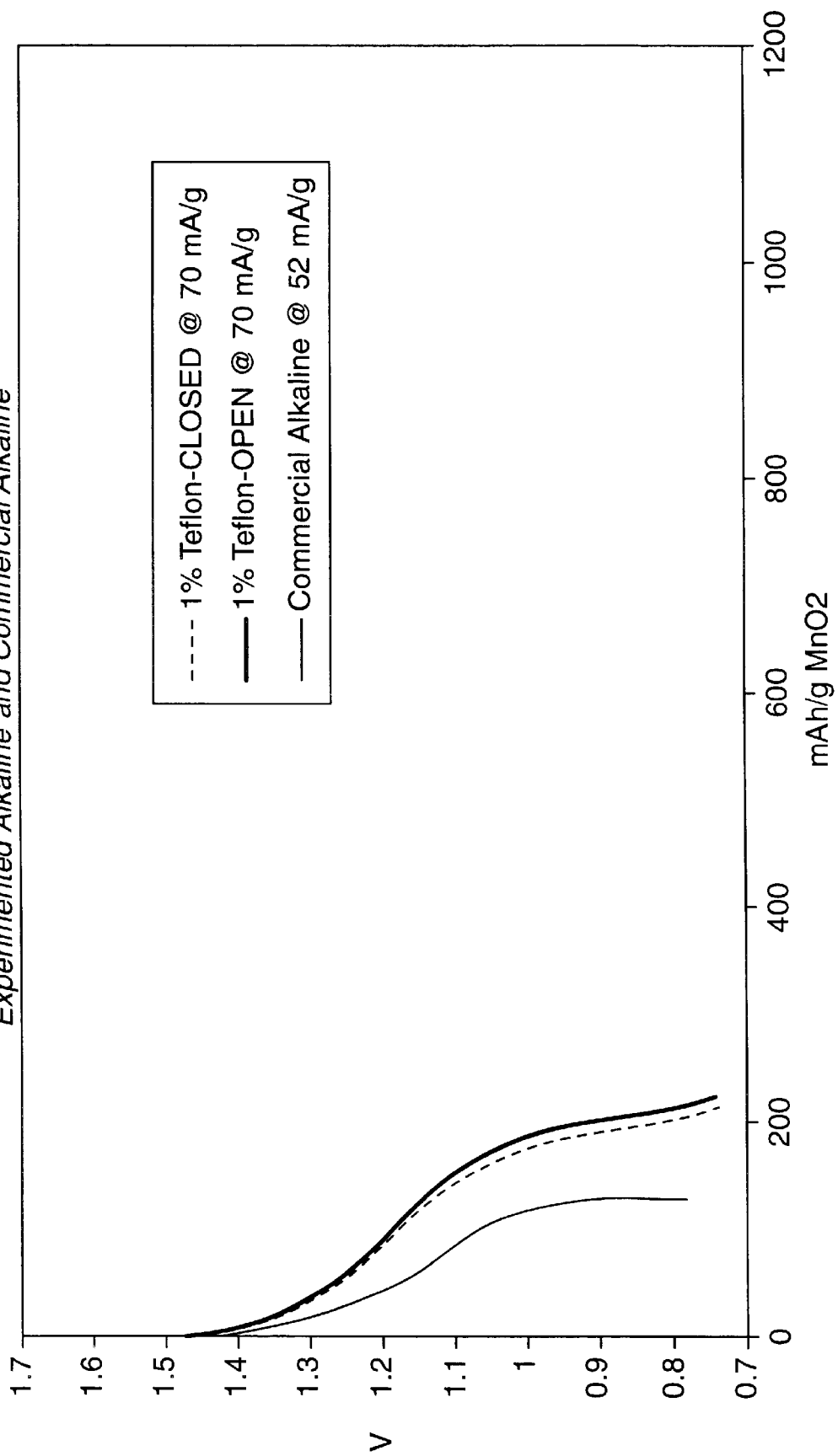
FIG. 4 is a graph showing voltage (V) vs. current (mA/g $MnO_2$) for open and closed cells made with cathodes containing 1% PTFE.

Referring to FIG. 4, the advantage of wet-proofing is demonstrated. With only 1% PTFE in the cathode mixture, the discharge efficiency of cathodes made with 1% PTFE is not substantially different for opened and closed cells. The cathode is soaked with electrolyte and air cannot enter to recharge the $MnO_2$.

Figure 5:
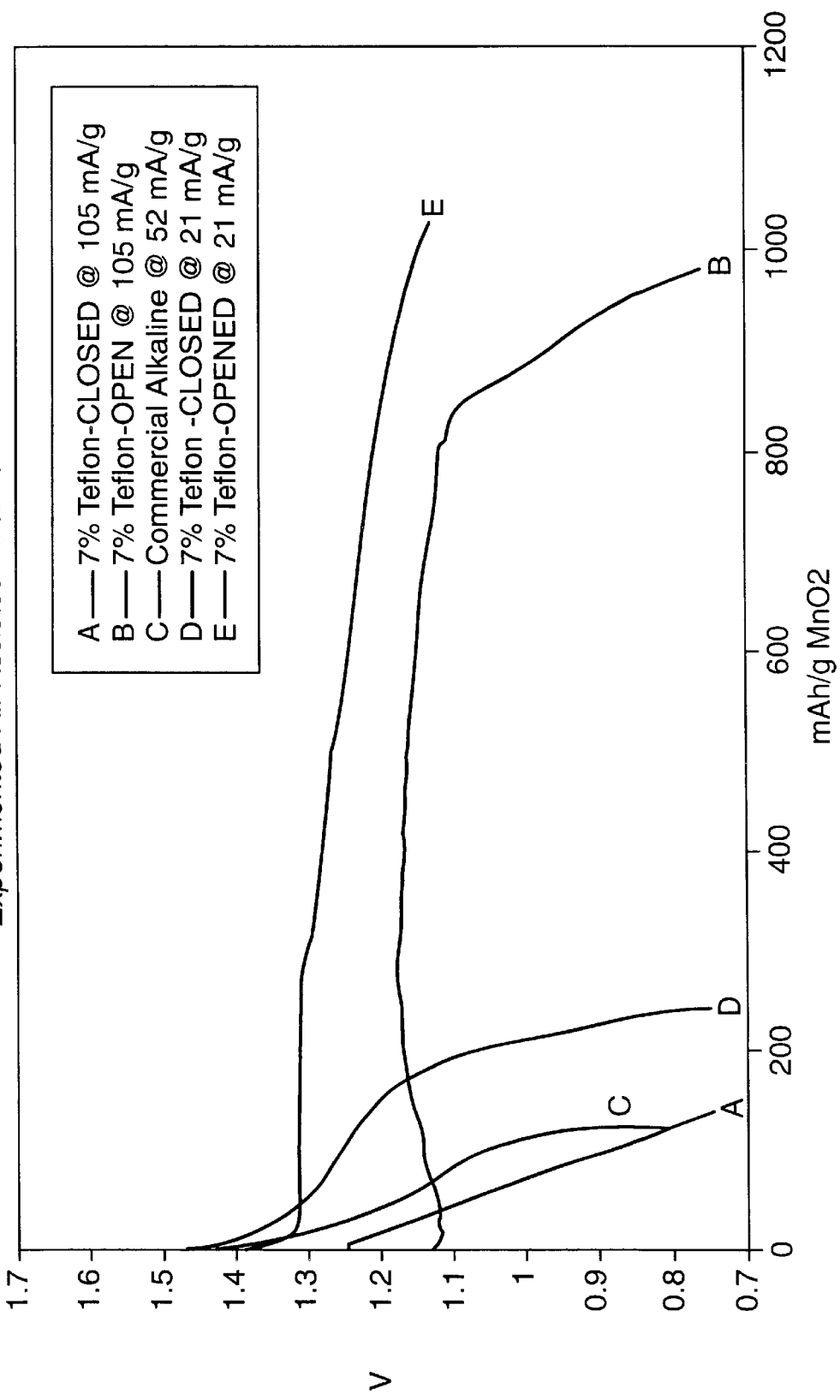
FIG. 5 is a graph showing voltage (V) vs. current (mA/g $MnO_2$) for open and closed cells made with cathodes containing 7% PTFE.

Referring to FIG. 5, when the amount of PTFE in the cathode is 7%, the discharge efficiency of $MnO_2$ in the opened cell is more than seven times higher than that in the closed cell. This result demonstrates that air can enter the cell and recharge the $MnO_2$. Preferably, the cathode 50 includes between 2–25%, and more preferably between 2–7%, of PTFE.

Moreover, while a cathode 50 with inadequate electrolyte repellent may have good ionic conductivity, ionic concentration gradients may cause wetting or flooding and could be detrimental to gas diffusion properties and the recharge of $MnO_2$. Adding amounts of carbon between 5–15% can provide effective electronic and ionic conductivity. The carbon particles are high surface area carbon present in an amount effective to enable recharging of the $MnO_2$. The different types of carbon that may be used include, but are not limited to, Black Pearls 2000 (Cabot, Billerica, Mass.), Vulcan XC-72 (Cabot), Monarch 1300, Shawinigan Black, Printex, Ketjen Black, and PWA.

The cathode 50 is formed to fit inside the can 20 while maintaining an air plenum 90 between the cathode assembly 30 and the can 20. The air plenum 90 allows air to be distributed to the cathode 50. For example, the cathode 50 can be shaped on an appropriately-sized mandrel to form a racetrack cathode assembly 30.

The cathode assembly 30 is wrapped with the barrier layer 60. As the battery 10 ages, electrolyte in the anode material 80 can travel through the cathode 50, for example, by wicking action through the cathode 50, and leak from the battery 10. The barrier layer 60, typically a 0.1 to 0.2 mm thick, air-permeable material such as PTFE, restricts the electrolyte from leaking out of the battery 10.

As described below, in one embodiment of the invention where the can 20 has air access openings formed in the wall of the can, the barrier layer 60 is wrapped with the air diffusion layer (not shown). During discharge of the battery 10, zinc (Zn) from the anode 80 can be oxidized to zinc oxide (ZnO), increasing the volume of the anode 80 and pushing the cathode 50 against the side of the can 20. The air diffusion layer helps to maintain an air diffusion space or plenum between the cathode 50 and the can 20 by restricting the cathode 50 from obstructing or plugging up the air access opening(s) in the can 20, thereby allowing the battery 10 to recharge. The air diffusion layer is typically a porous or fibrous material 0.1 to 0.2 mm thick, such as filter material (e.g., Whatman (Clifton, N.J.) Grades 54, F490-08, and F490-02).

As used herein, "bottom cup" generally means a member that separates the can 20 from the bottom of the anode 80 and/or the cathode 50. The member preferably has a bottom portion and a wall extending around the periphery of the bottom portion. Preferably, the bottom cup is electrically conducting and is fabricated to fit over an end of the cathode assembly 30 and into the can 20, e.g., by having a racetrack shape.

A preferred bottom cup 70, e.g., made of nickel-plated steel, is placed on one end of the cathode assembly 30. The bottom cup 70 contains the cathode assembly 30, to minimize leakage of electrolyte and to provide better electrical contact between the cathode 50 and the can 20. The bottom cup 70 can be connected to the cathode assembly 30 by welding. Welding secures the bottom cup 70 to the cathode assembly 30 and provides better electrical contact between the can 20, the bottom cup 90 and the cathode 50. As shown in FIGS. 2 and 3, the bottom cup 70 preferably has a rim 95 to help maintain the air plenum 90 between the cathode assembly 30 and the can 20. For example, for a racetrack battery 10, the bottom cup 70 may be shaped as a racetrack-shaped can having a rim and a bottom surface adapted to contact the can 20, as shown in FIG. 1. Additionally, the bottom cup 70 may define a groove 75 in which the cathode assembly 30 is placed. Prior to placing the bottom cup 70 on the cathode assembly 30, a sealant 100 can be placed in the groove 75 as a barrier to restrict the electrolyte from leaking through the cathode assembly 30 and out of the battery 10. The sealant is typically an asphalt sealant such as Asphalt B1128, available from BiWax Corp.

The separator 40 is placed in the cathode assembly 30. The separator 40 is used to contain the anode 80 and to electrically isolate the anode 80 from the cathode 50 so as not to short circuit the battery 10 by direct reaction of the cathode 50 and the anode 80. The separator 40, generally 0.05 to 0.08 mm thick, is typically a porous, electrically insulating polymer, such as polypropylene (Celgard 5550, Celanese (Summit, N.J.)) or polyvinyl alcohol (PVA), which allows the electrolyte in the anode material 80 to contact the cathode 50. As shown in FIG. 1, the separator 40 can be a racetrack-shaped container having an open end and a closed end. The separator 40 is formed on an appropriately-sized mandrel so as to fit inside the cathode assembly 30. Alternatively, the separator 40 can be applied in situ. For example, a solid PVA film 0.05–0.1 mm thick can be formed by coating the cathode 50 with a 5–20% PVA aqueous solution having a defoamer and a fungicide to prevent organic growth and drying the cathode 50 at about 60° C. In situ coated separators are described, for example, in U.S. patent application Ser. No. 09/280,367, filed Mar. 29, 1999, hereby incorporated by reference.

A top cup 110 is placed on the open end of the cathode assembly 30. As shown in FIG. 1, the top cup 110, typically made of a non-conducting material such as nylon, is sized to fit over the open end of the separator 40 and the cathode assembly 30, and to mate with a seal 120, as described below. As with the bottom cup 70, the top cup 110 defines a groove 115. Prior to placing the cathode assembly 30 in the top cup 110, an asphalt sealant 130, shown in FIG. 2, is placed in the groove 115 to act as a barrier against electrolyte leakage.

The cathode assembly 30 is placed into the can 20 such that the cathode 50 electrically contacts the can 20. The cathode 30 electrically contacts the can 20 via the bottom cup 70. If the bottom cup 70 is not used, the cathode 30 can directly contact the can 20. In order for the cathode 30 to contact the can 20 directly, the active material 50 can first be cleared from the current collector. The current collector can then be welded to the can 20.

Anode material 80 is typically a gel containing a mixture including zinc, an electrolyte, and a gelling agent. The zinc content is between about 60 and 80 percent by weight, preferably about 70 percent by weight. The electrolyte can be an aqueous solution of (9N) potassium hydroxide. The electrolyte can include between about 25 and 35 percent by weight, preferably about 30 percent of potassium hydroxide. The electrolyte can also include between about 1 and 2 percent of zinc oxide.

The gelling agent, described more below, helps prevent leakage of the electrolyte from the cell and helps suspend the particles of zinc.

The zinc material can be a zinc powder that is alloyed with lead, indium, aluminum, or bismuth. For example, the zinc can be alloyed with between 400 and 600 ppm (e.g., 500 ppm) of lead, between 400 and 600 ppm (e.g., 500 ppm) of indium, or between about 50 and 90 ppm (e.g., 70 ppm) of aluminum. The zinc material can be air blown or spun zinc. Suitable zinc particles are described, for example, in U.S. Ser. No. 09/156,915, filed Sep. 18, 1998, U.S. Ser. No. 08/905,254, filed Aug. 1, 1997, and U.S. Ser. No. 09/115, 867, filed Jul. 15, 1998, each of which is incorporated by reference in its entirety. The zinc can be a powder. The particles of the zinc can be spherical or nonspherical. For example, the zinc particles can be acicular in shape (having an aspect ratio of at least two).

The zinc material includes a majority of particles having sizes between 60 mesh and 325 mesh. For example, the zinc material can have the following particle size distribution:

0–3 wt % on 60 mesh screen;
40–60 wt % on 100 mesh screen;
30–50 wt % on 200 mesh screen;
0–3 wt % on 325 mesh screen; and
0–0.5 wt % on pan.

Suitable zinc materials include zinc available from Union Miniere (Overpelt, Belgium), Duracell (USA), Noranda (USA), Grillo (Germany), or Toho Zinc (Japan).

The gelling agent preferably is an absorbent polyacrylate. The absorbent polyacrylate has an absorbency envelope of less than about 30 grams of saline per gram of gelling agent, measured as described in U.S. Pat. No. 4,541,871, incorporated herein by reference. The anode gel includes less than 1 percent of the gelling agent by dry weight of zinc in the anode mixture. Preferably the gelling agent content is between about 0.2 and 0.8 percent by weight, more preferably between about 0.3 and 0.6 percent by weight, and most preferably about 0.33 percent by weight. The absorbent polyacrylate can be a sodium polyacrylate made by suspension polymerization. Suitable sodium polyacrylate have an average particle size between about 105 and 180 microns and a pH of about 7.5. Suitable gelling agents are described, for example, in U.S. Pat. No. 4,541,871, U.S. Pat. No. 4,590,227, or U.S. Pat. No. 4,507, 438.

In certain embodiments, the anode gel can include a non-ionic surfactant, and an indium or lead compound, such as indium hydroxide or lead acetate. The anode gel can include between about 50 and 500 ppm, preferably between 50 and 200 ppm, of the indium or lead compound. The surfactant can be a non-ionic phosphate surfactant, such as a nonionic alkyl phosphate or a non-ionic aryl phosphate (e.g., RA600 or RM510, available from Rohm & Haas) coated on a zinc surface. The anode gel can include between about 20 and 100 ppm of the surfactant coated onto the surface of the zinc material. The surfactant can serve as a gassing inhibitor.

After the anode material 80 has been placed in the can 20, a sealing assembly 140, including the seal 120, a current collector 160, and a support plate 150, is placed in the can 20. The sealing assembly 140 is provided to help prevent the anode material 100 from leaking, to seal the battery 10, and to electronically connect the anode 100 to an external circuit when the battery 10 is used in a device.

As shown in FIGS. 1 and 2, the seal 120 is fabricated to receive the current collector 160 and to mate with the top cup 110 such that the anode material 80 does not leak from the battery 10. The seal 120 is typically made of a non-conductive material such as nylon. The seal 120 has one hole 170 to receive the current collector 160. Although the seal 120 can have more than one hole to receive multiple current collectors, e.g., multiple nail-shaped collectors, having fewer holes minimizes the chance of anode material 80 leaking from the battery 10.

The seal 120 also has at least one air access opening 180. The rechargeability of the cathode 50 is governed in part by the diffusion rate of atmospheric oxygen into the cathode 50 and the rate of chemical reaction between oxygen and $MnO_2$. Openings 180 allow air to reach the cathode 50 so that the $MnO_2$ cathode can be recharged. Maximizing the number of openings 180 in the battery 10 can optimize performance of the battery 10 but can also increase the costs of manufacturing, depending on how the openings are formed, e.g., by injection molding, piercing, cutting, or laser drilling. Typically, 6 to 18 openings 180 are uniformly distributed around the seal 120, adjacent the outer perimeter of the seal 120, to provide uniform discharge and consistent performance. Openings 180 are preferably 0.5–1 mm in diameter and are made during injection molding of the seal 120.

Figure 6A:
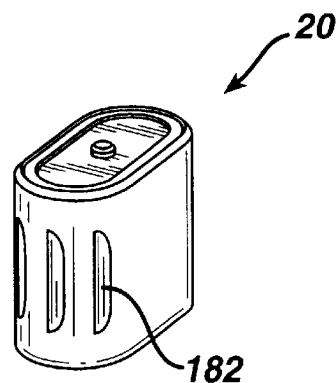
FIGS. 6A–B are perspective views of racetrack batteries having slots.
Figure 6B:
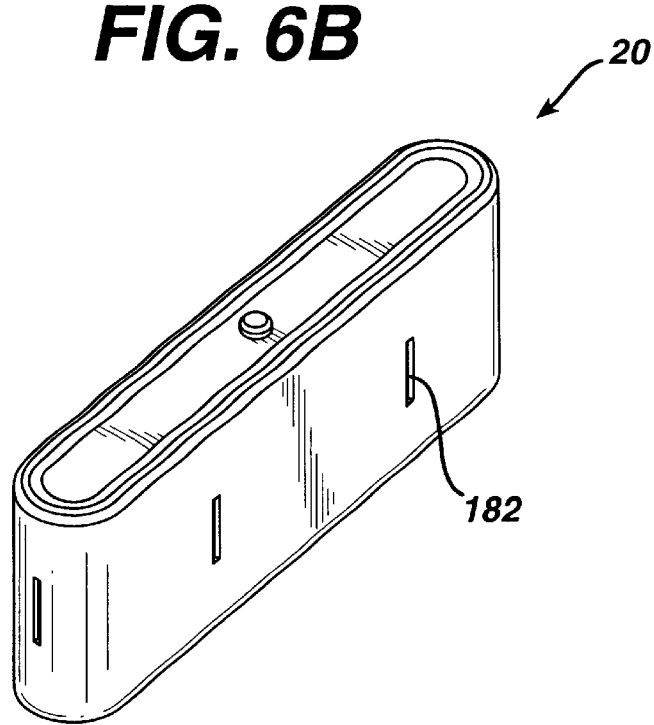

Alternatively, the air access openings 180 can be formed in the wall of the can 20. Openings 180 placed in the wall of the can 20 may decrease the diffusion path for air entering the can 20, thereby improving the recharging efficiency of the battery 10. Similar to the openings 180 described above, openings formed in the wall of the can 20 can be holes having a diameter of about 0.1 to about 1 mm in diameter. Openings 180 can also be formed as elongated slots 182. For example, FIG. 6A shows a battery can 20 having 3 louvers, or slots, 182 at each of the curved end of the can 20. The louvers 182, formed by displacing the material from a portion of the can, e.g., by punching, extend into the can 20 by about 0.2 to 0.5 mm, depending on the thickness of the can and the width of the louver. Batteries having louvers are described in more detail in U.S. patent application Ser. No. 09/374,277, filed Aug. 13, 1999, hereby incorporated by reference in its entirety. Referring to FIG. 6B, the elongated slots 182, about 0.1 to 0.4 mm wide, can also be formed by laser cutting the can 20. The specific dimensions of the slots 182 are selected to provide the battery with optimal and uniform performance, depending on the size of and the application for the battery. Other configurations for the air access openings are possible.

Figure 7:
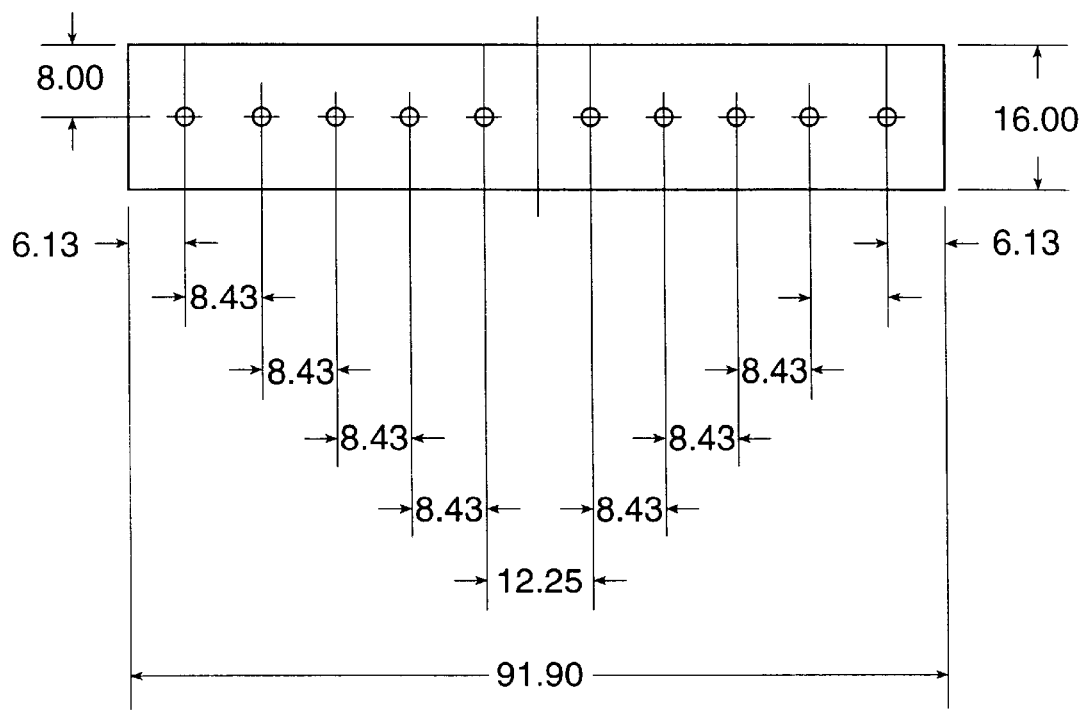
FIG. 7 is a layout view of a portion of an unwrapped battery can having air access openings in the wall of the can. Measurements are in millimeters.
Figure 8A:
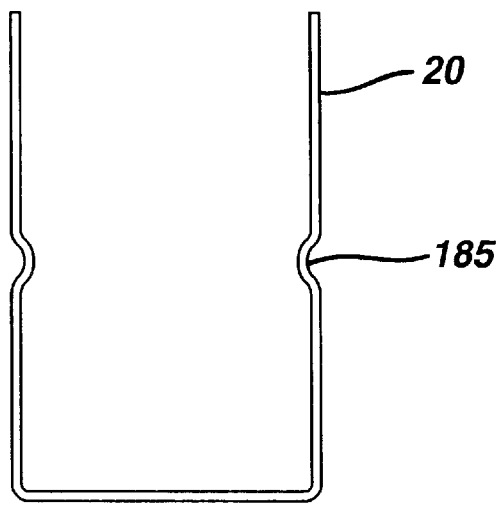
FIGS. 8A–B are cross-sectional views of battery cans having grooves.
Figure 8B:
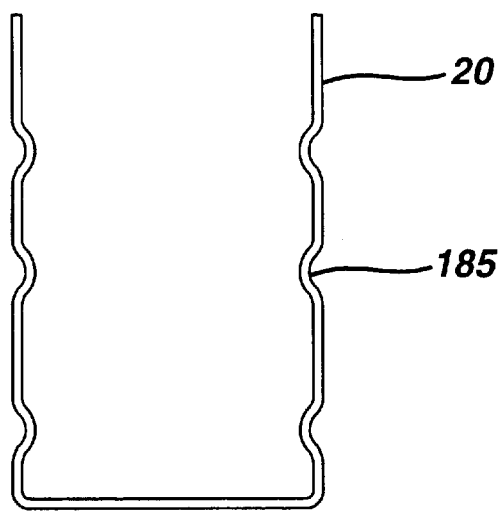

Generally, whether the openings 180 are formed in the wall of the can 20 or in the seal 120 is a function of the application for the battery and/or the ratio between the area of the openings 180 and the diffusion path length, sometimes called the A/L ratio. The diffusion path length, for example, can be the length of the air plenum 90. Batteries with large A/L ratios can recharge or restore quickly, but they can dry out quickly and have short shelf life. Batteries with small A/L ratios have long shelf life, but they restore slowly. The openings 180 generally have a diameter of about 0.3 mm and are typically formed by laser drilling. FIG. 7 shows a portion of an unwrapped battery can 20 having air access openings 180 on the side wall. In this embodiment of the invention, in addition or alternatively to using the air diffusion layer, a groove 185 can be formed in the can 20 to restrict the cathode 50 from obstructing the air access openings 180, as shown in FIGS. 8A–B. The groove 185 typically extends into the can 20 about 0.1 to 0.2 mm, approximately the thickness of the air diffusion layer. As shown in FIG. 8A, the groove 185 can extend just around the center of the battery 10 since expanding anode material 80 typically bulges the center of the cathode assembly 30 the most. In another embodiment, shown in FIG. 8B, the battery 10 can include a plurality of grooves 185 spaced along the height of the battery 10. The groove 185 is typically formed after the battery 10 has been assembled so that the cathode assembly 30 can be inserted into the can 20; the grooves 185 are deformed by rolling the battery 10 around an indentation wheel.

The seal 120 also defines a recess 190 sized for containing the support plate 150. The support plate 150 is made of an electrical conductor, e.g., nickel-plated steel, dimensioned to fit in the recess 190 such that the battery 10 can be sealed by mechanically crimping the can 20 over the seal 120. The support plate 150 has an opening 200 to receive the current collector 160, which is riveted to the support plate 150 to provide electrical contact.

Figure 9A:
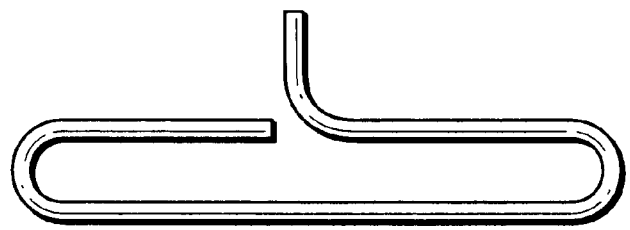
FIGS. 9A–B are perspective views of current collectors.
Figure 9B:
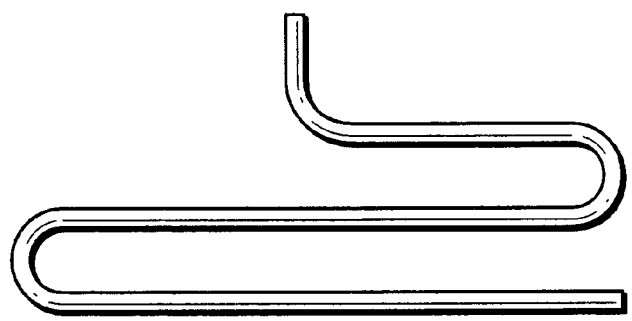

The anode current collector 160 is shaped to provide the battery 10 with uniform discharge. Since the length of a racetrack battery typically is larger than its thickness, i.e., it is anisotropic, the current collector 160 is shaped such that the distance between the current collector 160 and the reaction interface of the anode 80 is minimized and generally uniform throughout the battery 10. Non-uniform discharge can lead to inconsistent battery performance and less than optimum capacity of the battery. Accordingly, for effective current collection, the current collector 160 is shaped to extend substantially along a full length of the battery 10 to help the battery 10 discharge at uniform rates. For example, as shown in FIGS. 9A–B, the current collector 160 can be a member such as a wire having at least two separate portions extending substantially along a full length of the battery 10, or it can be shaped similarly to a triangle. The current collector 160 is made of an electrically conducting material, such as brass or tin-plated brass wire, that is able to resist the corrosive effects of the anode material 80. The current collector 160 is also fabricated to mate with an opening in the seal 170.

Figure 10:
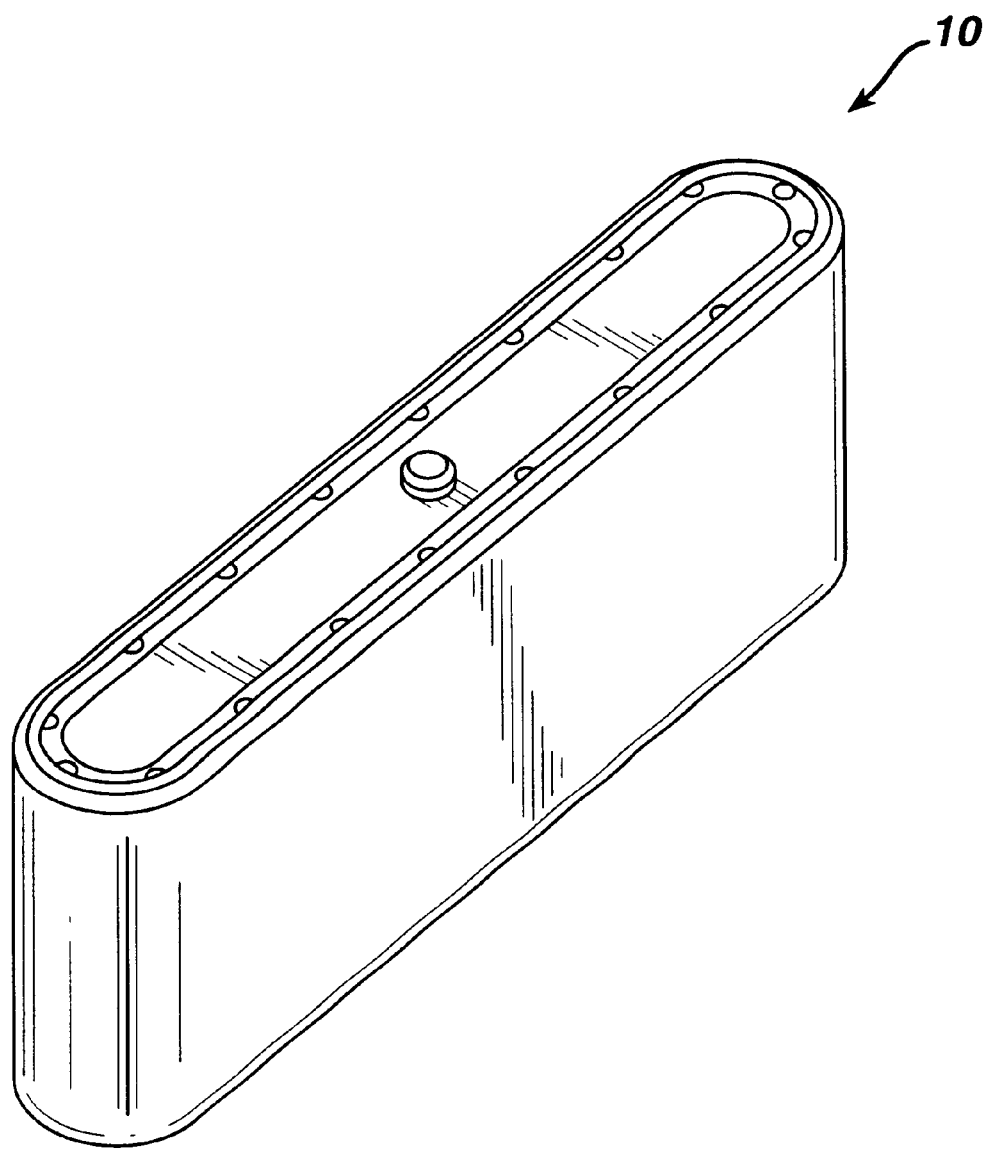
FIG. 10 is a perspective view of an assembled racetrack air recovery battery of the invention.

The battery 10 is sealed by mechanically crimping the can 20 over the support plate 150. The assembled battery 10 is placed in an appropriately-sized die, and the rim of the can 20 is mechanically crimped over the support plate 150 and seal 120, sealing the battery 10. Additionally, to prevent the battery 10 from leaking during storage, e.g., due to expansion and contraction of the battery 10, sealing the can 20 may include providing along the crimp a sealant, e.g., asphalt sealant (BiWax Corp.). An assembled battery 10 is shown FIG. 10.

Example

A racetrack air recovery battery was prepared as follows.

A cathode was cut to desired dimensions (12 mm×86 mm). A 3 to 4 mm wide area of the plaque was scraped to expose the current collector grid. A tab, about 14 mm long, was welded to the exposed grid.

A cathode assembly was formed by cutting the separator to the appropriate dimensions and wrapping it around a mandrel having a racetrack design of smaller width, length and radius than that of the battery can. An end of the separator was heat sealed.

The cathode was wound tightly around the mandrel on top of the separator. A pre-cut Teflon (barrier) layer was wrapped around the cathode, with the layer being pulled to provide a tight fit. An air diffusion layer was wrapped around the Teflon layer.

Using a syringe, a sealant was dispensed on the bottom of the can. The cathode assembly was slid off the mandrel and transferred to the can, which had 10 openings positioned as shown in FIG. 7. A slightly larger racetrack mandrel was inserted into the can to insure a tight fit between the separator and the cathode, while not pressing the cathode assembly against the wall of the can. The tab was welded to the sidewall of the can.

Using a syringe, a sealant was dispensed on top of the cathode. Using a syringe, the zinc anode was dispensed into the cavity formed by the cathode and the separator. The anode current collector end was inserted through the seal and the support plate and then riveted to the support plate to form the top sub-assembly.

The top subassembly was placed on top of the cathode. The battery was placed in appropriately-sized die, and the battery was sealed by mechanically crimping the edge of battery can over the seal and the support plate.

All publications and patents mentioned in this application are herein incorporated by reference to the same extent as if each individual publication or patent was specifically and individually indicated to be incorporated by reference.

A number of embodiments of the invention have been described. Nevertheless, it will be understood that various modifications may be made without departing from the spirit and scope of the invention. For example, can 20 may include detents, bumps, or vertical grooves that extend inwardly, toward cathode 50, to help centralize the cathode 50 within the can 20 and to provide a uniform air plenum around the cathode 50. The bottom cup 70 should then be formed with enough clearance to pass by the bumps, detents and grooves. Can 20 may also include supports and/or a weakened, undercut lip at the top of the can 20 to support the seal 120. The supports and/or lip can protect the cathode from possible damage when the can mechanically crimped. Alternatively or in addition, the crimping forces can be reduced.

Other embodiments are in the claims.

What is claimed is:

1. A racetrack air recovery battery comprising:
   a can having a racetrack cross section, a bottom surface and a sidewall extending from the bottom surface, the sidewall having an opening;
   a cathode disposed in the can, the cathode capable of recharging when contacted with oxygen;
   anode material disposed in the can; and
   a separator between the cathode and the anode.

2. The battery of claim 1, wherein the opening comprises a louver.

3. The battery of claim 1, wherein the opening comprises an elongated slot.

4. An air recovery battery comprising:
   a can having a racetrack cross section;
   a cathode assembly disposed in the can;
   a bottom cup disposed on an end of the cathode assembly; and
   anode material disposed in the can.

5. The battery of claim 4, wherein the bottom cup comprises a bottom portion and a wall extending around the periphery of the bottom portion.

6. The battery of claim 5, wherein the bottom cup further comprises a rim extending around a portion of the wall.

7. The battery of claim 4, wherein the bottom cup comprises a groove.

8. The battery of claim 4, wherein the bottom cup has a racetrack shape.

9. The battery of claim 4, wherein the a portion of the cathode assembly is welded to the bottom cup.

10. The battery of claim 4, further comprising a sealant between the cathode assembly and the bottom cup.

11. The battery of claim 4, wherein the cathode assembly includes a barrier layer.

12. The battery of claim 4, wherein the cathode assembly includes an air diffusion layer.

13. The battery of claim 4, wherein the can includes a groove.

14. The battery of claim 4, wherein the can includes at least one air access opening.

15. The battery of claim 14, wherein the air access opening is an elongated slot.

16. The battery of claim 14, wherein the air access opening is a louver.

17. The battery of claim 4, wherein the cathode assembly includes manganese dioxide.

18. The battery of claim 4, wherein the anode material includes zinc.

19. An air recovery battery comprising:
   a can having a racetrack cross section;
   a cathode assembly disposed in the can;
   anode material disposed in the can; and
   a seal assembly disposed in the can, the seal assembly including a current collector having a rod with first portion extending in a first direction and an adjoining second portion extending in a second direction different than the first direction.

20. The air recovery battery of claim 19, wherein the first and second portions extend in opposite directions.

21. The battery of claim 19, wherein the first or second portion extends substantially along a full length of the battery.

22. The battery of claim 19, wherein a portion of the current collector approximates a triangle.

23. The battery of claim 19, wherein the can comprises an air access opening.

24. The battery of claim 19, wherein the seal assembly comprises an air access opening.

25. The battery of claim 19, wherein the current collector is disposed substantially centered in the can.

26. A method of assembling an air recovery battery, the method comprising:
   (a) inserting a cathode assembly into a can having a racetrack cross section;
   (b) placing anode material in the can;
   (c) inserting a seal assembly into the can, the seal assembly having a current collector;
   (d) sealing the can; and
      placing a bottom cup on an end of the cathode assembly.

27. The method of claim 26, further comprising placing a barrier layer adjacent to the cathode assembly.

28. The method of claim 26, further comprising placing an air diffusion layer around the cathode assembly.

29. The method of claim 26, further comprising forming a groove in the can.

30. The method of claim 26, wherein step (d) includes mechanical crimping.

31. The battery of claim 1, wherein the sidewall further includes a groove extending into the can.

* * * * *